(12) United States Patent  
Sierra

(10) Patent No.: US 7,568,992 B1
(45) Date of Patent: Aug. 4, 2009

(54) SELF-ADJUSTING POSITIVE ENGAGEMENT CONTINUOUS VARIABLE TRANSMISSION

(76) Inventor: Fernando Sierra, cra. 39 #13sur-95, apt. 1001, Ed Escosia, Medellin (CO)

(*) Notice: Subject to any disclaimer, the term of this patent is extended or adjusted under 35 U.S.C. 154(b) by 257 days.

(21) Appl. No.: 11/648,454

(22) Filed: Dec. 29, 2006

(51) Int. Cl.
*F16H 48/06* (2006.01)

(52) U.S. Cl. ............... 475/221; 475/36; 475/53

(58) Field of Classification Search ........... 475/221, 475/220, 53, 36
See application file for complete search history.

(56) References Cited

U.S. PATENT DOCUMENTS

| | | | |
|---|---|---|---|
| 4,077,278 A * | 3/1978 | Combastet | 475/330 |
| 4,799,158 A | 1/1989 | Patil | |
| 5,063,813 A | 11/1991 | Lentz | |
| 5,662,009 A * | 9/1997 | Palmer | 74/810.1 |
| 6,129,164 A * | 10/2000 | Teal et al. | 180/6.2 |
| 6,213,908 B1 * | 4/2001 | Hsiao | 475/221 |
| 6,579,206 B2 | 6/2003 | Liu et al. | |
| 6,716,136 B2 | 4/2004 | Hrovat et al. | |
| 6,937,930 B2 | 8/2005 | Pirotais | |
| 2005/0247504 A1 | 11/2005 | Gleasman et al. | |
| 2007/0155576 A1 * | 7/2007 | Shapiro | 475/221 |

FOREIGN PATENT DOCUMENTS

FR  2638801 A1 *  5/1990

* cited by examiner

*Primary Examiner*—David D. Le
(74) *Attorney, Agent, or Firm*—Gold & Rizvi, P.A.; Glenn E. Gold; H. John Rizvi

(57) ABSTRACT

A two-stage, continuously variable transmission used to power a machine, incorporates self-adjusting features while ensuring a positive engagement. Power from an engine is transferred via a rotatable shaft of a first stage, which engages with a first stage differential gear. The first stage gear delivers power to each of (1) a low ratio and (2) a high ratio first stage output half shafts. A second stage includes each of (1) a low ratio and (2) a high ratio second stage input half shaft. The low ratio half shafts are engaged providing a first pathway. The high ratio half shafts are engaged providing a second pathway, both shafts in positive engagement. A second stage differential gear receives low and high gear ratio power simultaneously, over the first and second pathways and aggregates the power to be output at an automatically selected optimum gear ratio for the machine, determined by the kinetic status of the machine.

3 Claims, 3 Drawing Sheets

SELF-ADJUSTING POSITIVE ENGAGEMENT CONTINUOUS VARIABLE TRANSMISSION

BACKGROUND OF THE INVENTION

1. Field of the Invention

The present invention relates to continuous variable transmissions and particularly to a self adjusting positive engagement continuous variable transmission having two differential gears arranged in sequence to deliver power to a single output shaft in continuously variable transmission ratios over a range of rotational speeds to maintain optimum acceleration.

2. Description of the Prior Art

Machines, which are powered by a rotating shaft connected to an engine, frequently require a transmission to adjust the ratio of rotational speeds between the engine and the shaft. Engines, such as gasoline engines, typically operate optimally at relatively high rates of rotational speed, in comparison to the rotational speed required for the shaft, which is powering the machine. It is conventional practice to arrange gears of varying circumference and varying numbers of gear teeth, in a power train, to reduce the output rotational speed from an optimal operating speed, for the engine, to a suitable speed, for the machine.

Certain machines must change the speed, at which they operate, during the course of operation. This is the case with motor vehicles, which must operate over a range of speeds. While the speed of a vehicle changes, during use, it is desirable to maintain the speed of the engine within a relatively narrow range, to extend the life of the engine and to maximize the power value delivered to the machine. In some cases, where an engine is being used to power a vehicle and another machine simultaneously, it may be necessary to change the speed of the vehicle but to maintain a nearly constant speed of the other machine.

Transmissions are constructed with mechanisms to deliver a selection of gear ratios to provide power at maximum torque values to a machine operating at varying speeds. Transmissions may include a sequence of gears in a power train arranged so that power is transferred from gear to gear by meshed gear teeth in positive engagement, throughout the power train. Transmission mechanisms may operate to disconnect a gear from the power train and connect another gear of different diameter and number of gear teeth, to produce a power output at a different gear ratio. Automatic transmissions may have mechanisms to stop or start one or more gears in a planetary arrangement to produce power output at differing gear ratios. Typically, clutches are employed to disengage gears to allow shifting but it is an advantage to have the entire power train in positive engagement to limit power loss due to friction and slipping. Motor vehicles may be designed with transmissions providing four or more discrete gear ratios for efficient operation over a full range of anticipated speeds of operation. Vehicles such as farm equipment, which operate within a more narrow range of speeds, may have another piece of farm equipment connected to a power out drive. The additional piece of farm equipment may require a nearly constant operational speed, thus requiring a relatively large number of gear ratios to drive the vehicle at varying speeds while maintaining the engine at a nearly constant rotational speed.

In order to provide smooth and relatively seamless gear shifting, for motor vehicles, and to provide constant rotational speed, for farm vehicles, without increasing the number of discrete gears to an impractical number, continuous variable transmissions have been developed. Continuous variable transmissions are known to be of three basic types; namely, frictional, hydrostatic, and ratcheting. U.S. Pat. No. 5,243,881, to Hayashi, discloses a control apparatus for a continuous variable transmission and describes the belt and pulley type of continuous variable transmission. U.S. Pat. No. 6,063,004, to Ibamoto, also discloses a control apparatus, for a continuous variable transmission and describes the belt and pulley type and also the frictional type of continuous variable transmission. The control apparatus receives and processes data from the engine and the machine. The control apparatus continually sends command signals to the transmission for producing the optimum transmission ratio, at any given time. These transmissions select and output continuously variable transmission ratios to a drive shaft, by applying tension or resistance, in varying degree to elements of the power train. Inevitably, some power is lost in the process of altering the transmission ratio so as to deliver power, at an appropriate torque value, to the output shaft, which drives the machine.

There is a need for a continuous variable transmission that separates power input into low gear ratio power and high gear ratio power and subsequently aggregates the power to produce a power output over a full and continuous range of gear ratios.

There is a need for a continuous variable transmission that delivers power over separate positive engagement pathways namely a low gear ratio pathway and a high gear ratio pathway for outputting power efficiently over a full and continuous range of desired gear ratios.

There is a need for a continuous variable transmission that can automatically select an optimum gear ratio without the need for a complex control mechanism. For every angular velocity on the differential gear, there is a different overall gear ratio.

SUMMARY OF THE INVENTION

The present invention is directed to a continuous variable transmission which is designed to initially separate and channel power along two separate pathways and subsequently aggregate the power to produce an output, at an optimum gear ratio, which is automatically selected, depending on the kinetic status of the machine, (i.e., speed and amount of energy stored in the system—such as kinetic energy or inertia). The continuous variable transmission comprises a first stage assembly and a second stage assembly. The first stage assembly comprises a first stage power input means, a first stage power channeling means, and two first stage power output means, namely a low ratio first stage power output means and a high ratio first stage power output means. The second stage assembly comprises two second-stage power input means; namely, a low ratio second stage power input means and a high ratio second stage power input means, second stage power channeling means, and a second stage power output means.

The first stage power input means may be a rotatable shaft, operably connected to an engine for receiving power in the form of rotational energy, and to the first stage power channeling means for applying power to the first stage power channeling means. The first stage power channeling means may be a first stage differential gear configured for outputting power, in the form of rotational energy, separately and at differing rotational rates, to each of the two first stage power output means, which may also be rotatable shafts. The second stage power channeling means may be a second stage differential gear configured for receiving input of power, in the form of rotational energy, separately and at differing rotational rates, from each of two second stage power input means, which may also be rotatable shafts. The low ratio first stage power output means and the low ratio second stage power input means are operably connected for delivering power over a first pathway. The high ratio first stage power output means and the high ratio second stage power input means are operably connected for delivering power over a second pathway. The operable connections of the first and second pathways may comprise meshed gears for maintaining positive engagement throughout the transmission. The second stage differential is configured for aggregating and outputting the power from the first and second pathways, to the second stage power output means at an intermediate gear ratio, automatically selected, according to a load on the second stage power output means.

The second stage power output means may be operably connected to a machine to be powered at varying speeds and bearing varying loads. The continuous variable transmission of the present invention will deliver power according to a current rotational speed of the machine and the load on the machine. The first stage assembly and the second stage assembly cooperate by separating power over the first and second pathways and by aggregating power to effectively produce an optimum gear ratio at the second stage power output means. For every angular velocity on the differential gear there is a different overall gear ratio.

It is an object of the present invention to provide a continuous variable transmission which initially separates power into low gear ratio and high gear ratio power and subsequently aggregates the power to produce an output over a range of speeds in automatically selected continuously variable gear ratios for optimum torque values.

It is another object of the present invention to provide a continuous variable transmission, which delivers power over separate positive engagement pathways, namely a low gear ratio pathway and a high gear ratio pathway for outputting power efficiently over a full range of desired gear ratios.

It is yet another object of the present invention to provide a continuous variable transmission, which automatically selects an optimum gear ratio without the need of a complex control mechanism.

BRIEF DESCRIPTION OF THE DRAWINGS

The invention will be further understood, by way of example, with reference to the accompanying drawings, in which.

DETAILED DESCRIPTION OF THE PREFERRED EMBODIMENTS

Shown throughout the drawings, the present invention is directed toward a self adjusting positive engagement continuous variable transmission which initially separates power into a low gear ratio pathway and a high gear ratio pathway and subsequently aggregates the power to output power at an automatically selected gear ratio for optimum torque, over a full range of rotational speeds.

Figure 1:
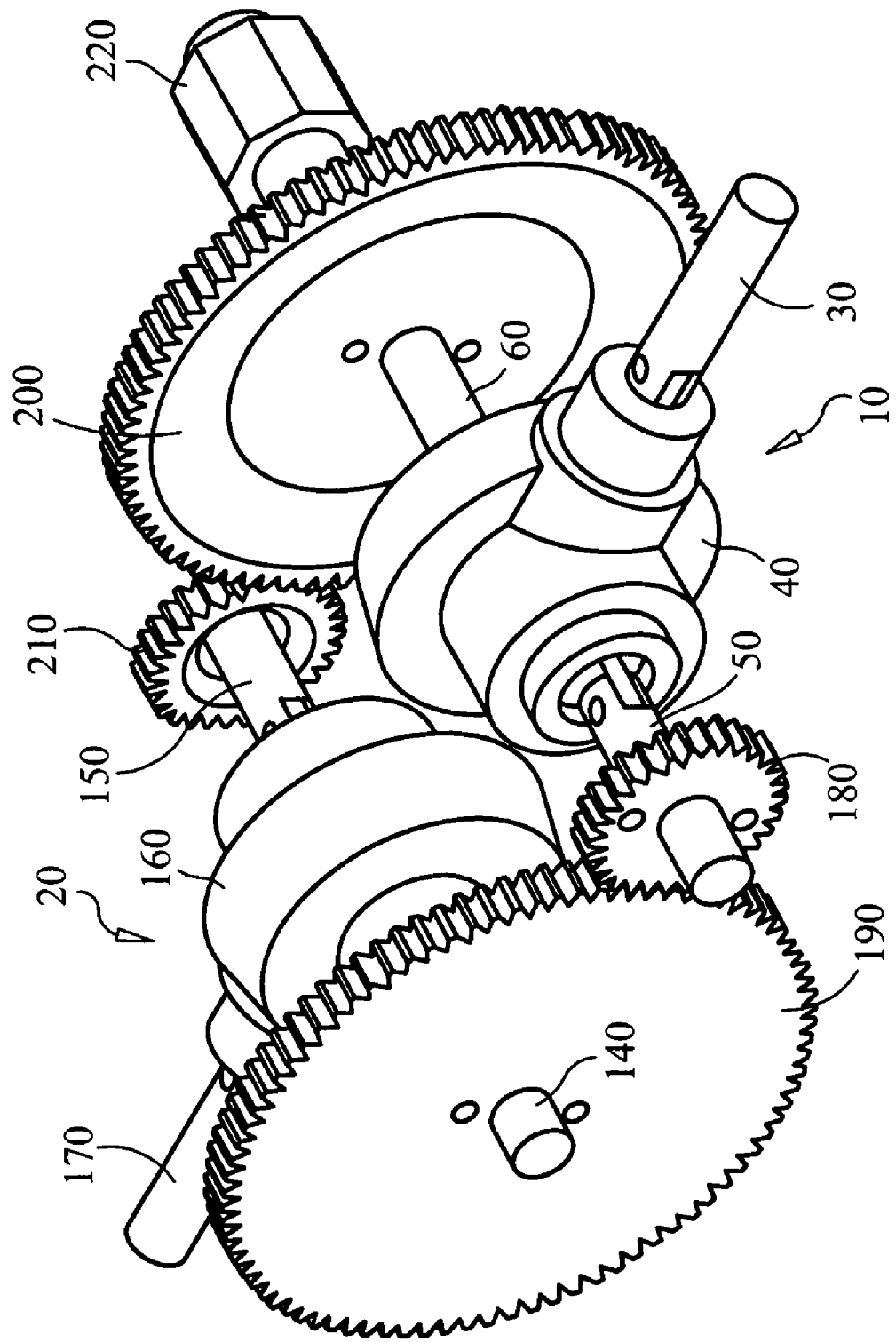
FIG. 1 is an input side perspective view of the continuous variable transmission of the present invention.
Figure 2:
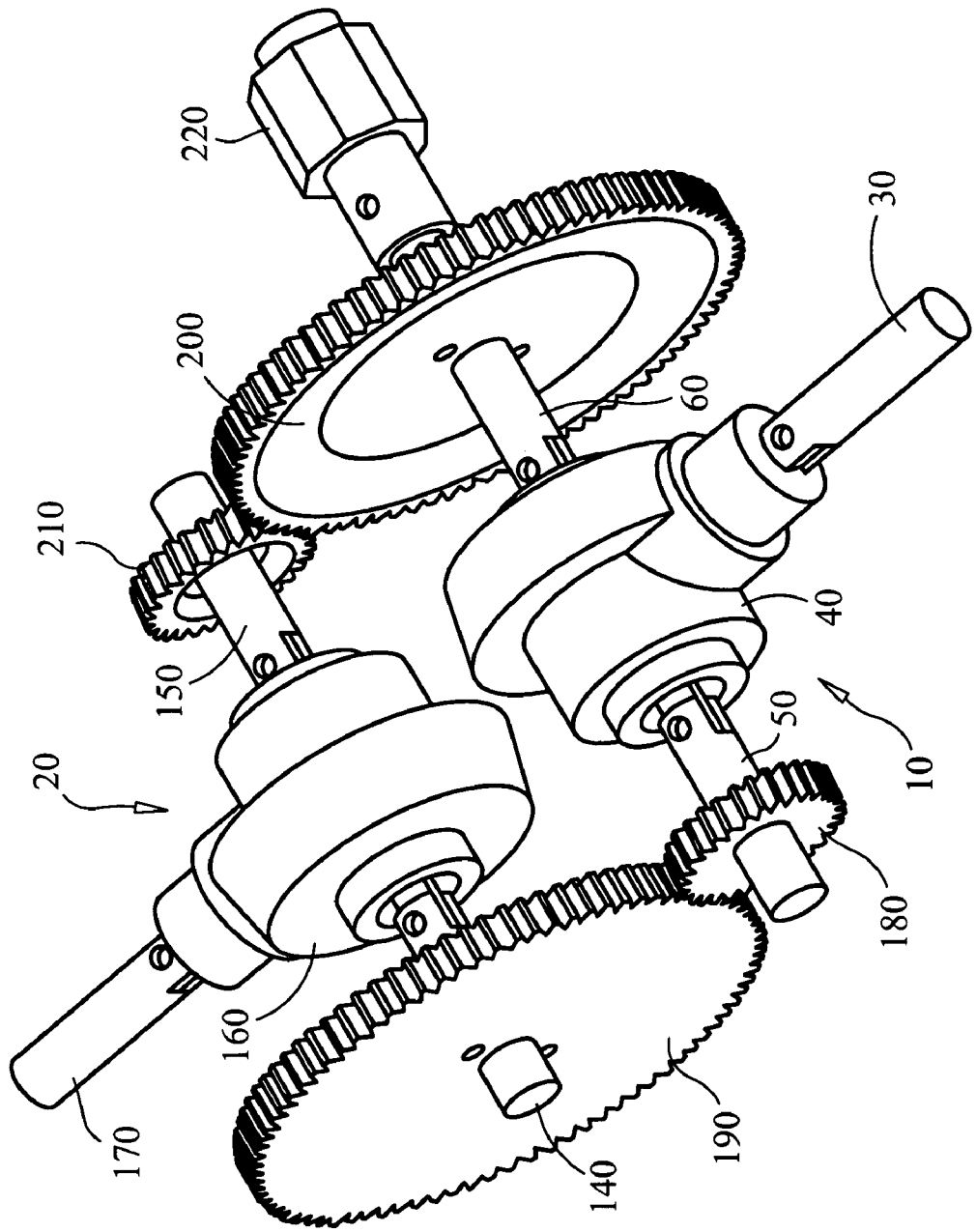
FIG. 2 is a top perspective view of the continuous variable transmission of the present invention.

The continuous variable transmission, as shown in FIGS. 1 and 2, comprises a first stage assembly 10, which separates power, and a second stage assembly 20, which aggregates power, for operation of a machine under load. It is intended that a power source, in the form of rotational energy generated by an engine, or other source of rotational energy is to be input to the first stage assembly 10. The power may be directly input from an engine or the power may be passed through a transmission of conventional design to alter the rotational speed from that of an engine drive shaft to a higher or lower speed suitable for the machine to be operated. It is to be understood that the machine may be a motor vehicle intended to be operated over a range of speeds or a stationary machine having a range of operational speeds.

The first stage assembly 10 includes a first stage power input means, preferably a rotatably mounted first stage input shaft 30, which is operably connected to the power source, for delivery of power to the first stage assembly 10, by rotation of the first stage input shaft 30. The first stage assembly 10 also includes a first stage power channeling means and two first stage power output means, namely a low ratio first stage power output means and a high ratio first stage power output means. The first stage channeling means is preferably a first stage differential gear 40, operably connected to the first stage input shaft 30. The low ratio first stage power output means is preferably a low ratio first stage output half shaft 50 and the high ratio first stage power output means is preferably a high ratio first stage output half shaft 60. The low ratio first stage output half shaft 50 and the high ratio first stage output half shaft 60 are each operably connected to the first stage differential gear 40.

Figure 3:
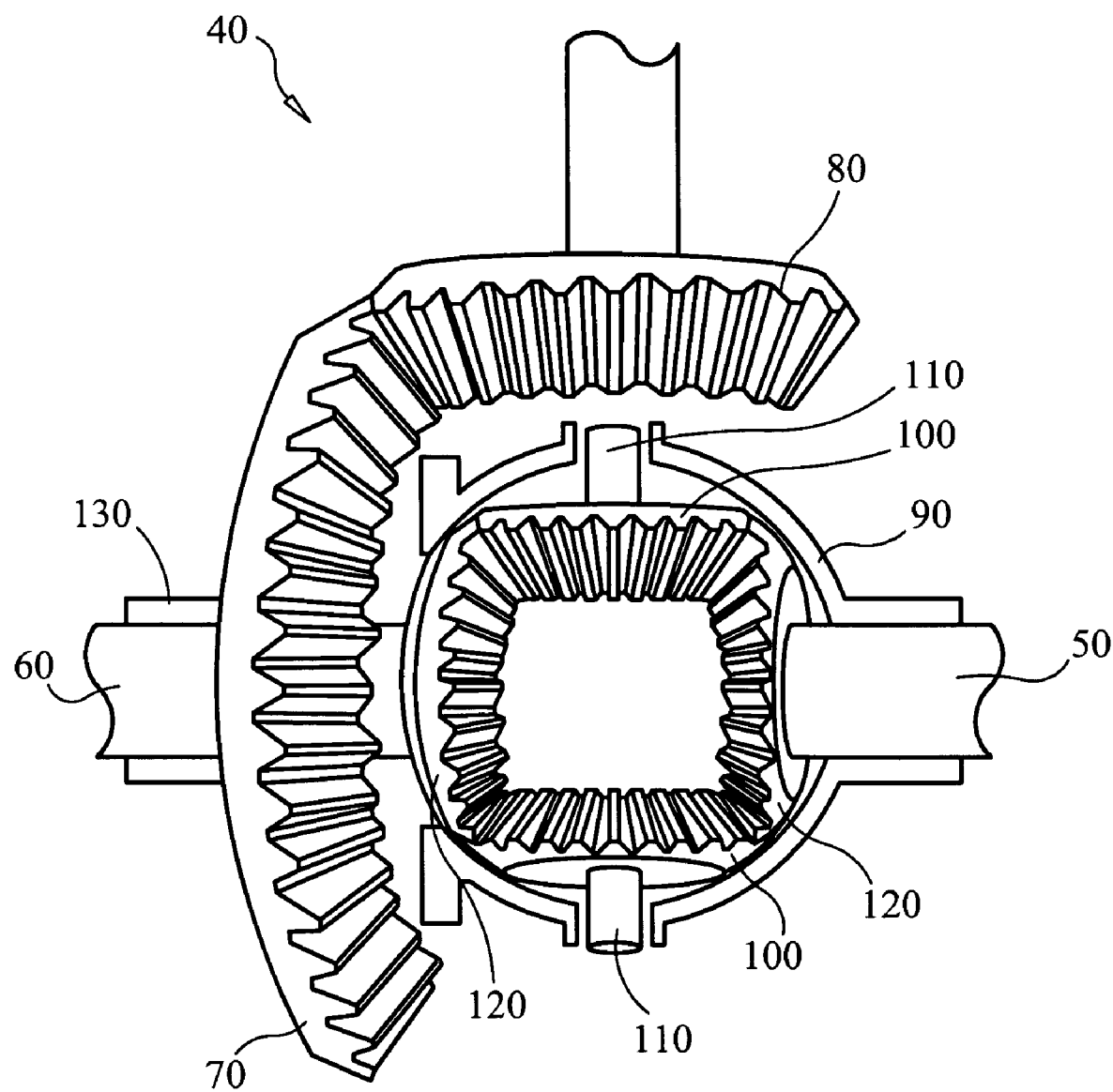
FIG. 3 is a perspective view of a first stage differential gear of the present invention, with the housing box cut away to display the inside space.

The first stage differential gear 40, includes a first stage crown wheel 70 shown in FIG. 3 with a beveled aspect having a circumferential run of gear teeth. A first stage bevel pinion 80 is mounted on the first stage input shaft 30. The first stage crown wheel 70 and the bevel pinion 80 are adapted and meshed, according to conventional practice so as to directly transfer rotation of the first stage input shaft 30 to the first stage crown wheel 70. A first stage housing box 90, having an inside space, is fixed to the first stage crown wheel 70, for synchronous rotation. A plurality of first stage differential pinions 100 are each rotatably mounted on one of a plurality of first stage differential pinion shafts 110. The first stage differential pinion shafts 110 are rotatably mounted on the first stage housing box 90 and extend into the inside space, generally perpendicular to the axis of rotation of the first stage crown wheel 70, so as to dispose the first stage differential pinions 100 within said inside space. A pair of first stage bevel wheels 120 are aligned and spaced apart, within the inside space. The first stage bevel wheels 120 are each provided with a circumferential run of gear teeth and are arranged such that the first stage differential pinions 100 are disposed in the space between the first stage bevel wheels 120, such that the gear teeth of the first stage bevel wheels 120 mesh simultaneously with each of the first stage differential pinions 100. The low ratio first stage output half shaft 50 and the high ratio first stage output half shaft 60 are each fixed to a one of the pair of first stage bevel wheels 120, such that rotation of the first stage housing box 90 causes rotation of the low ratio first stage output half shaft 50 and the high ratio first stage output half shaft 60; however, the rotatable first stage differential pinions 100 allow independent rates of rotation of the low ratio first stage output half shaft 50 and the high ratio first stage output half shaft 60. It is preferred that the first stage crown wheel 70 be mounted on a first stage sleeve 130 surrounding either the low ratio first stage output half shaft 50 or the high ratio first stage output half shaft 60, for economy of space required for the first stage channeling means. In FIG. 3, the first stage sleeve 130 surrounds the high ratio first stage output half shaft 60. It is to be understood that the first stage differential gear 40, of the present invention is formed and configured in the manner of a conventional differential gear and that other varied designs of conventional differential gears will serve the purpose of the first stage channeling means of the present invention.

The second stage assembly 20 includes two second stage power input means, namely a low ratio second stage power input means and a high ratio second stage power input means, a second stage power channeling means, and a second stage power output means. The low ratio second stage power input means is preferably a low ratio second stage input half shaft 140 and the high ratio second stage power input means is preferably a high ratio second stage input half shaft 150. The second stage power channeling means is preferably a second stage differential gear 160. The second stage power output means is preferably a second stage output shaft 170. The second stage differential gear 160 is preferably constructed and configured in the same manner as the first stage differential gear 40, such that the low ratio second stage input half shaft 140 and the high ratio second stage input half shaft 150 may simultaneously rotate at differing speeds while each delivers power to the second stage output shaft 170, through the second stage differential gear 160. It is to be understood that the second stage differential gear 160 includes counterpart components assembled like the first stage differential gear 40, shown in FIG. 3.

The low ratio first stage output half shaft 50 and the low ratio second stage input half shaft 140 are operably connected by a plurality of gears. A low ratio output gear 180 mounted on the low ratio first stage output half shaft 50 for synchronous rotation and a low ratio input gear 190 mounted on the low ratio second stage input half shaft 140, also for synchronous rotation. The low ratio output gear 180 and the low ratio input gear 190 are positioned and aligned to mesh so as to transfer rotational energy output from the first stage to the second stage. The operable connection from the low ratio first stage output half shaft 50 to the low ratio second stage input half shaft 140 forms a first pathway, by which power may be delivered to the second stage power output means. It is preferred that the size and gear tooth number of the low ratio output gear 180 and the low ratio input gear 190 be selected and arranged so as to provide power over the first pathway at the lowest intended gear ratio required for the machine to be operated by the transmission of the present invention.

The high ratio first stage output half shaft 60 and the high ratio second stage input half shaft 150 are operably connected by a plurality of gears. A high ratio output gear 200 mounted on the high ratio first stage output half shaft 60 for synchronous rotation and a high ratio input gear 210 mounted on the high ratio second stage input half shaft 150 also for synchronous rotation. The high ratio output gear 200 and the high ratio input gear 210 are positioned and aligned to mesh so as to transfer rotational energy output from the first stage to the second stage. The operable connection from the high ratio first stage output half shaft 60 to the high ratio second stage input half shaft 150 forms a second pathway, by which power may be delivered to the second stage power output means. It is preferred that the size and gear tooth number of the high ratio output gear 200 and the high ratio input gear 210 be selected and arranged so as to provide power over the second pathway at the highest intended gear ratio required for the machine to be operated by the transmission of the present invention.

It will be appreciated that the power train over the first pathway and the second pathway, from the first stage input shaft 30 to the second stage output shaft 170 is a sequence of gears in positive engagement throughout. The transmission of the present invention eliminates power loss through the operation of clutches, belts or other friction generating equipment. When power, in the form of rotational energy is applied to the first stage input shaft 30, the low ratio first stage output half shaft 50 and the high ratio first stage output half shaft 60 tend to rotate at the same speed, distributing power to the first pathway and the second pathway. The differences in the selected sizes and tooth number of the gears, namely the low ratio output gear 180, the low ratio input gear 190, the high ratio output gear 200, and the high ratio input gear 210, as depicted in exemplary fashion in FIGS. 1 and 2, causes the low ratio second stage input half shaft 140 to rotate at a lower speed than the high ratio second stage input half shaft 150. The second stage differential gear 160 aggregates the power, from the first pathway and the second pathway, and outputs rotational energy on the second stage output shaft 170. As a load is placed on the second stage output shaft 170, the transmission, of the present invention will automatically respond by aggregating the power from the first and second pathways in varying proportions to produce an output on the second stage output shaft 170, having an optimum torque value for turning the machine. No control mechanism is necessary to achieve the selection of the optimum torque output.

A relatively large load on the second stage output shaft 170 may cause the second stage differential gear 160 to reverse the direction of rotation, on the high ratio second stage input half shaft 150, and thereby reverse the direction of power transfer over the second pathway. For this reason, it is preferred that the second pathway include means for preventing reversal of power on the second pathway. FIGS. 1 and 2 depict an embodiment of the present invention having means for preventing reversal, namely a ratchet bearing 220, of conventional design installed on the high ratio first stage output half shaft 60, for preventing reverse rotation in the second pathway.

Alternatively, the transmission may be used to produce an output at a predetermined angular speed by adding a control mechanism, of conventional design, to govern the output, on the second stage output shaft 170 at a preset rotational speed.

While the preferred embodiments of the invention have been described above, it will be recognized and understood that various modifications can be made in the invention and the appended claims are intended to cover all such modifications which may fall within the spirit and scope of the invention.

What is claimed is:

1. A self adjusting positive engagement continuous variable transmission configured for operable connection to a machine bearing a load, said transmission comprising:
   a first stage assembly and a second stage assembly;
   said first stage assembly comprising a first stage power input means, a first stage power channeling means, and two first stage power output means, namely a low ratio first stage power output and a high ratio first stage power output;
   said first stage power input means being operably connected to said first stage power channeling means and being configured for applying power, in the form of rotational energy, to said first stage power channeling means;
   said first stage power channeling means being operably connected to said two first stage power output means and being configured for applying power, in the form of rotational energy, separately and at differing rotational rates, to each of said two first stage power output means;
   said second stage assembly comprising, two second stage power input means, namely a low ratio second stage power input means and a high ratio second stage power input means, a second stage power channeling means, and a second stage power output means;

said low ratio second stage power input means being operably connected to said low ratio first stage power output means;

said high ratio second stage power input means being operably connected to said high ratio first stage power output means;

said two second stage power input means being operably connected to said second stage power channeling means for applying power, in the form of rotational energy, separately and at differing rotational rates to said second stage power channeling means;

said second stage power channeling means being operably connected to said second stage power output means, which is operably connected to said machine bearing a load, said first stage and said second stage being configured to cooperate for delivering power, in the form of rotational energy, at continuously variable rotational speeds and torque values, according to the load on said machine; and a ratchet bearing in communication with at least one of said first stage power output means, wherein said ratchet bearing prevents reversal of the first stage power output means.

2. The transmission of claim 1, wherein:

said first stage power channeling means is a first stage differential gear and said second stage power channeling means is a second stage differential gear;

said first stage power input means is a rotatably mounted first stage input shaft, each of said first stage power output means is a rotatably mounted first stage output half shaft, each of said second stage power input means is a rotatably mounted second stage input half shaft, and said second stage power output means is a rotatably mounted second stage output shaft;

said operable connection between said low ratio first stage power output means said low ratio second stage power input means is provided by a low ratio power output gear mounted on said low ratio first stage power output half shaft and a low ratio power input gear mounted on said low ratio second stage power input half shaft, each having a circumferential run of gear teeth, said low ratio power output gear and said low ratio power input gear being adapted and positioned so as to mesh in positive engagement;

said operable connection between said high ratio first stage power output means and said high ratio second stage power input means is provided by a high ratio power output gear mounted on said high ratio first stage power output half shaft and a high ratio power input gear mounted on said second stage high ratio power input half shaft;

said high ratio power output gear and said high ratio power input gear being adapted and positioned so as to mesh in positive engagement;

whereby a positive engagement power train on a first pathway including said first stage input shaft, said first stage differential gear, said low ratio first stage output half shaft, said low ratio second stage input half shaft, said second stage differential gear, and said second stage output shaft and a positive engagement power train on a second pathway including said first stage input shaft, said first stage differential gear, said high ratio first stage output half shaft, said high ratio second stage input half shaft, said second stage differential gear, and said second stage output shaft, aggregated in said second stage to output rotational energy in continuous variable gear ratios, according to the load on said second stage output shaft.

3. The transmission of claim 2, wherein:

said first stage differential gear and said second stage differential gear each include:

a rotatably mounted crown wheel;

a housing box, having a wall defining an inside space, fixed to said crown wheel, for synchronous rotation;

a plurality of pinions, rotatably mounted on pinion shafts extending into said inside space generally perpendicular to the axis of rotation of said crown wheel;

said pinion shafts being connected to said wall for synchronous rotation with said housing box;

a pair of facing spaced apart bevel wheels meshed with said pinions and rotatably mounted in said inside space;

said bevel wheels having an axis of rotation parallel to the axis of rotation of said crown wheel;

said pair of bevel wheels, of said first stage differential gear, being a low ratio first stage bevel wheel, mounted on said low ratio first stage output half shaft, and a high ratio first stage bevel wheel, mounted on said high ratio first stage output half shaft;

said pair of bevel wheels, of said second stage differential gear, being a low ratio second stage bevel wheel mounted on a low ratio second stage input half shaft, and a high ratio second stage bevel wheel, mounted on a high ratio second stage input half shaft;

said crown wheel, of said first stage differential gear is operably connected to said rotatably mounted first stage input shaft and said crown wheel, of said second stage differential gear is operably connected to said rotatably mounted second stage output shaft.

\* \* \* \* \*